United States Patent [19]

D'Esopo

[11] 3,777,215
[45] Dec. 4, 1973

[54] BREAKER FAILURE RELAY DEVICE

[75] Inventor: Conrad M. D'Esopo, South Easton, Mass.

[73] Assignee: Westinghouse Electric Corporation, Pittsburgh, Pa.

[22] Filed: June 2, 1972

[21] Appl. No.: 259,129

[52] U.S. Cl. ............ 317/26, 317/36 TD, 317/27 R, 307/18
[51] Int. Cl. ............................................. H02h 3/00
[58] Field of Search .............. 317/26, 36 TD, 27 R, 317/36 D; 307/18

[56] References Cited
UNITED STATES PATENTS
3,144,585   8/1964   Blakemore............................ 317/26
3,259,802   7/1966   Steen..................................... 317/26

Primary Examiner—William M. Shoop, Jr.
Assistant Examiner—Harvey Fendelman
Attorney—A. T. Stratton et al.

[57] ABSTRACT

A device for sensing the failure of a principal breaker to interrupt the flow of fault current therethrough which is unaffected by the magnitude of the fault current to be interrupted.

6 Claims, 2 Drawing Figures

BREAKER FAILURE RELAY DEVICE

SUMMARY OF THE INVENTION

Normally the actuation of the principal breaker in response to the sensing of a fault by a fault detector results in the opening of the principal breaker and the interruption of the fault current which was flowing therethrough. In exceptional circumstances this does not happen for one reason or another and back-up breakers must be actuated to prevent excessive damage to the power network. These back-up breakers when actuated deenergize other power circuits resulting in the interruption of unfaulted circuits. The actuation of back-up breakers should be avoided when possible but which actuation is of course essential if the principal breaker is actually unable to, or for any reason does not, interrupt the fault current. When current greater than a predetermined minimum magnitude flows through the principal breaker at a time interval beyond that established for the breaker to interrupt the fault current, the breaker is presumed to have failed and back-up breakers must be actuated to interrupt the fault current.

In accordance with prior art devices of which I am aware, the current sensing device with its reactive energy storing elements is energized throughout the existence of the fault current. Since the magnitude of the fault current is highly variable depending upon the fault location, its impedance, the stiffness of the potential supply, etc., the magnitude of the stored energy will vary widely. The time for the stored energy to dissipate is a variable depending upon its magnitude. Therefore, it became necessary in the prior art devices to provide a time interval which is dependent upon the worst possible expected conditions. This of course increases the interval between actuation of the tripping circuit of the primary breaker and of the actuation of the tripping circuit of the back-up breaker when a less severe condition occurs.

Such a system, for a three-phase power transmission system is illustrated in FIG. 15 of an information leaflet I.L. 41-777E printed and published by Westinghouse Electric Corporation (FIG. 2 of this application). As illustrated therein, the three-phase currents and the zero sequence current are supplied to three current to voltage transducers. The output voltages of the transducers are rectified and the one thereof with the greatest magnitude is supplied to the sensing circuit (See FIG. 6 of the I.L.). If this supplied quantity is above a minimum predetermined magnitude, an amplified output logical 1 quantity is supplied to the OR(T2) network and a logical 1 is supplied to one input of the AND network (T3). When a fault condition occurs, the fault detector, (which may be a distance relay) closes contacts 62X and a logical 1 is supplied to the other input of the AND network (T3). The two logical 1's cause the AND network to supply a logical 1 to start the timing out of the timer and to the OR network (T1) whereby the AND network will maintain the timer actuated as long as the sensing circuit senses a current greater than the predetermined minimum current. If this current magnitude continues until the timer times out the timer actuates the trip relay TR to energize the breaker failure relay 86BF which locks energized.

In accordance with this invention a timer is actuated directly by the 62X contacts and is set to time out in a predetermined time interval which is the total time (5 cycles) represented by the normal fault clearing time of the breaker (2 cycles), and a margin time (3 cycles). Assuming the back-up breakers are also 2 cycle breakers and a fault detector or protective relay time of 1 cycle, the back-up breaker will clear the fault in 8 cycles (5 + 2 + 1) after the occurrence of the fault when the primary breaker fails. The prior art breaker failure device is usually set to provide a time interval of 10 to 12 cycles. With modern transmission voltages, and network interconnections, this reduction of upward of 20 percent is extremely important and reduces to a minimum the damage to equipment and system stability.

DETAILED DESCRIPTION

Figure 1:
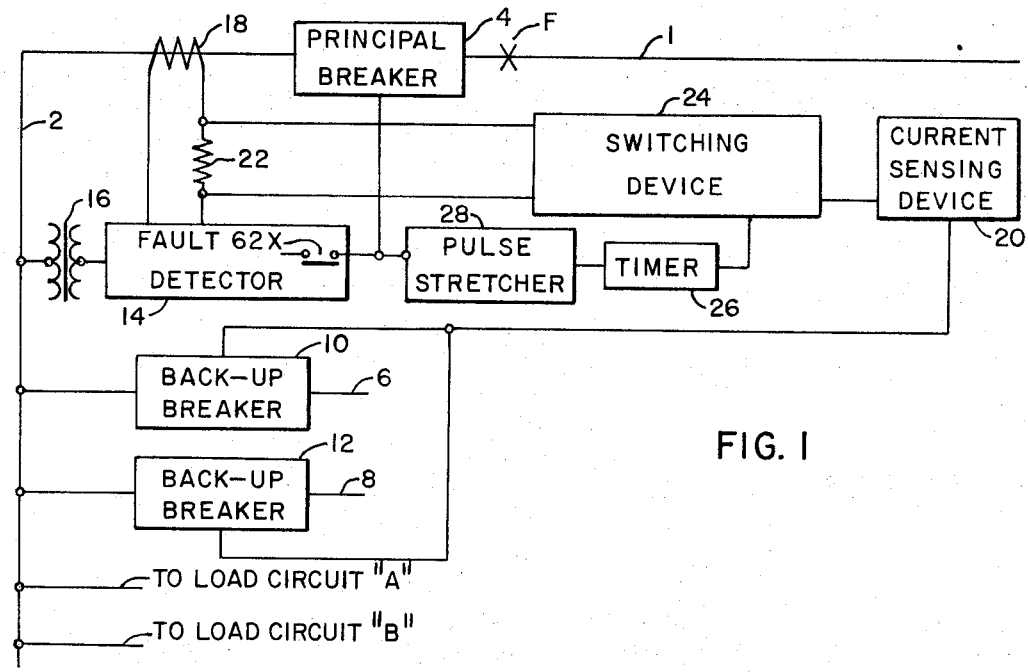
FIG. 1 is a block diagram of a system embodying the invention.

Referring to the drawings by characters of reference, the numeral 1 designates generally a transmission line connected to a local bus 2 through a principal breaker 4. The bus 2 is connected to energized power lines 6 and 8 through breakers 10 and 12 which as far as a fault F in line 1 is concerned are back-up breakers and are herein so designated.

The principal breaker 4 is controlled by a fault detector or protective relay 14. The detector 14, as illustrated, is energize with a voltage signal proportional to the voltage of the bus 2 by means of the potential transformer 16 and with a current signal proportional to the current in line 1 by means of the current transformer 18. For simplification, a single phase transmission line is illustrated with the illustrated lines being energized by the ungrounded potential. It will be appreciated, however, that the invention is equally applicable to a polyphase system wherein each phase would include a current transformer and potential transformer and a separate fault detector. If the usual polyphase breakers are used, each fault detector would energize the principal breaker 4 and a single current sensing device 20 energized by the polyphase lines would be used for the two back-up polyphase breakers 10 and 12. If single phase breakers are used then of course each fault detector would energize a breaker in its own phase and a separate current sensing device would be energized from each current transformer and individually connected to actuate its respective breaker in its respective phase.

As illustrated in FIG. 1, a signal quantity having a magnitude indicative of the current in line 1 is developed across the resistor 22 connected between the current transformer 18 and the current input to the fault detector 14. The signal quantity, upon actuation of the switching device 24, is effective to energize the device 20. The device 20 may take any of many forms wherein an output signal is provided when the magnitude of its energizing signal is greater than a predetermined minimum magnitude.

A suitable form of the device 20 for the single phase system would comprise an input voltage transformer, a phase splitting network, a full wave rectifier, a circuit to sense the magnitude of the rectifier input signal quantity, and an output circuit energized when the magnitude of the rectified input signal reaches or exceeds the predetermined minimum magnitude. A similar sensing device for three phase is illustrated in FIG.

Figure 2:
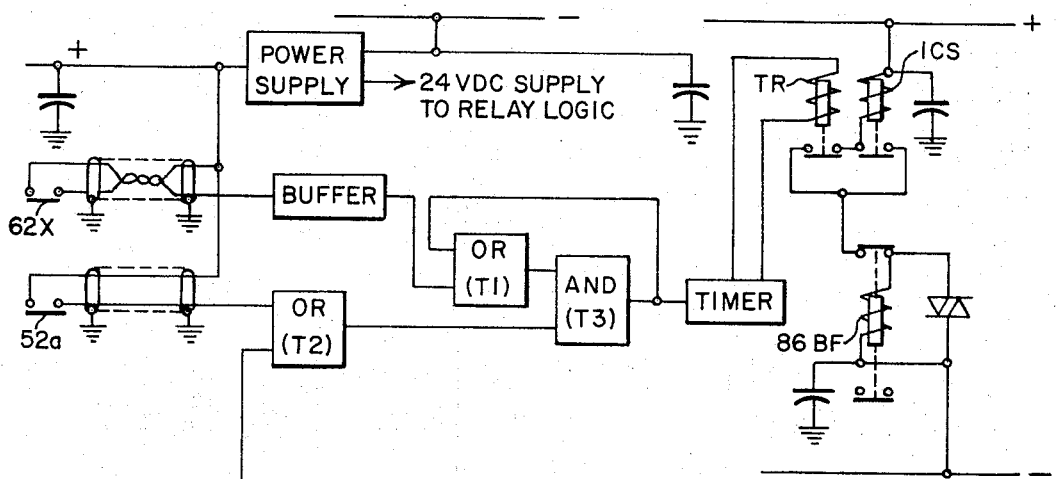
FIG. 2 is a block diagram of a prior art system.
Figure 2:
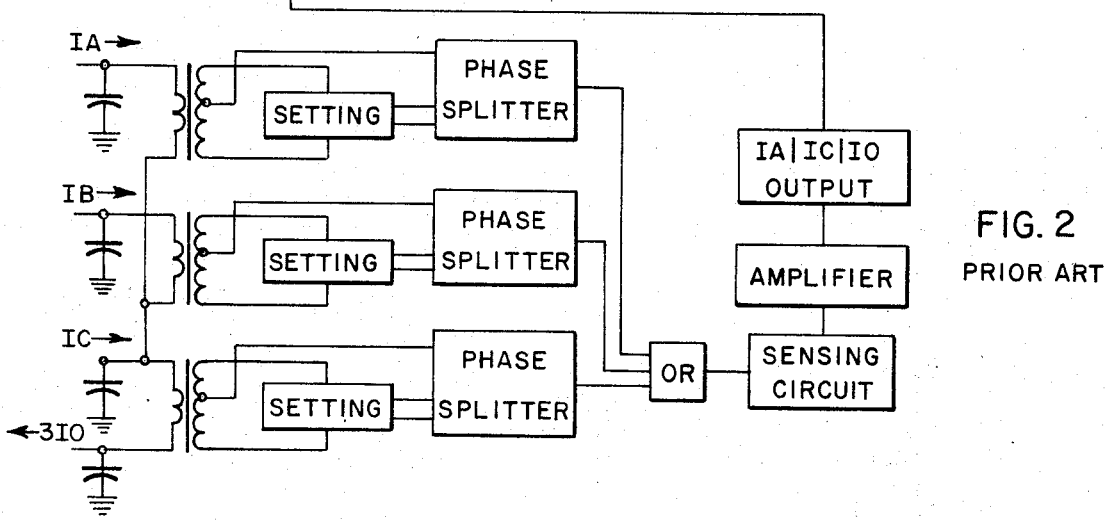

6 of the I.L. The FIG. 6 device like FIG. 2 hereof uses current energized transducers and in such event the resistor 22 would be omitted and the switching device 24 instead of being normally open would be normally closed.

A timer 26 is initiated to time out its predetermined interval by operation of the fualt detector 14 (closure of the 62X contacts) through a pulse stretcher 28. Such a timer could take the form of a Westinghouse TD–5 Time Delay Relay as illustrated in its published information leaflet I.L. 41–579.1K. The pulse stretcher is a well known device which automatically seals itself energized when the contacts 62X close and which after a time interval greater than the maximum time interval of the timer 26 will automatically deenergize itself or reset. When timed out, the timer 26 actuates the switching device into closed circuit condition to cause the quantity representing the current in line 1 to energize the device 20. Alternately, if current actuated transducers are used, the timer 26 will actuate the device 24 into open circuit condition to remove the current shunt thereacross.

It will, therefore, be apparent that there has been disclosed a breaker failure network which will reduce the time required to actuate the back-up breakers in the event of the failure of the primary breaker to interrupt the fault current without reducing the power network security (the needless deenergization of unfaulted portions of the power network by operation of the back-up breakers).

What is claimed and is desired to be secured by United States Letters Patent is as follows:

1. A protective relaying apparatus for an electrically energized power circuit connected to a power supply through circuit breaker contacts, said apparatus comprising a first circuit energizable with an analog output quantity having a magnitude determinable by the magnitude of current flowing through said breaker contacts, a fault detector having an input circuit connected to said first circuit whereby said detector is energized by said analog output quantity, said detector also having an output circuit, said output circuit being actuated when the energization of said input circuit indicates a faulted condition of the power circuit being protected by said breaker contacts, a timer connected to said output circuit and effective to time out a predetermined time interval subsequent to its actuation by said output circuit, a switching device having first and second operating conditions and connected to said timer for actuation from its said first to its said second conditions at the end of its said time interval, an analog electrical quantity magnitude sensing device for sensing the level of said analog output quantity, said sensing device having an input and output, circuit means connecting said input of said sensing device to said first circuit and including said switching device, said switching device normally being maintained in a first condition to prevent energization of said magnitude sensing device and having a second condition in which said sensing device is energized by said analog output quantity to determine the presence and absence of a minimum magnitude of said analog output quantity solely subsequent to the timing out of said timer and the actuation of said switching device thereby.

2. A breaker failure apparatus for energizing a back-up breaker upon the failure of the principal breaker to interrupt the flow of fault current, said apparatus comprising a timer having an input connected for actuation substantially concurrently with the energization of said principal breaker, said timer being operable to time out a predetermined interval when actuated, a fault current sensing circuit having an analog output quantity the magnitude of which varies as an analog of the magnitude of said fault current flowing through said principal breaker, an analog quantity measuring device, circuit means effective to couple said measuring device with said sensing circuit for rendering said device responsive to measure the magnitude of said analog output quantity, means coupling said circuit means to said timer and effective to render said circuit means effective to couple said measuring device to said sensing circuit solely subsequent to the timing out of said predetermined interval by said timer, said measuring device being responsive to a predetermined minimum value of said analog quantity to actuate said back-up breaker.

3. The combination of claim 2 in which said circuit means include a normally open switching device which is actuated to circuit closed condition as a consequence of the timing out of said timer.

4. The combination of claim 3 in which sensing circuit is energized with energy derived from a current transformer having its primary winding in series circuit with the circuit through said primary breaker.

5. The combination of claim 4 which includes a fault detector energized at least in part by said current transformer, said fault detector having an output connected to actuate said primary breaker upon the occurrence of a fault in the power line being protected by said principal breaker.

6. In a breaker failure apparatus, an energizable principal breaker tripping circuit, said tripping circuit being operable when energized to actuate a principal breaker to open circuit condition, an analog quantity sensing device including reactive elements, a fault current sensing circuit having an analog output quantity determined by the magnitude of the current flowing through said principal breaker, circuit means including a switching device for connecting said current sensing circuit to said reactive elements, said switching device having first and second operating conditions, said switching device being normally in its said first condition to prevent the energization of said reactive elements by said analog output quantity, and timing means interconnecting said tripping circuit and said switching device, said timing means being effective subsequent to a predetermined minimum time interval after the energization of said tripping circuit to actuate said switching device to its said second operating condition to render said elements energized by said analog output quantity of said sensing circuit.

* * * * *